US008630337B2

(12) United States Patent
Meyer

(10) Patent No.: US 8,630,337 B2
(45) Date of Patent: Jan. 14, 2014

(54) DVB-S2 DEMODULATOR

(75) Inventor: Jacques Meyer, Saint-Martin-le-Vinoux (FR)

(73) Assignee: STMicroelectronics (Grenoble 2) SAS, Grenoble (FR)

(*) Notice: Subject to any disclaimer, the term of this patent is extended or adjusted under 35 U.S.C. 154(b) by 742 days.

(21) Appl. No.: 12/787,290

(22) Filed: May 25, 2010

(65) Prior Publication Data
US 2010/0309970 A1 Dec. 9, 2010

(30) Foreign Application Priority Data

Jun. 5, 2009 (FR) .................................. 09 02720

(51) Int. Cl.
*H03H 7/30* (2006.01)
*H04B 1/10* (2006.01)
*H04L 27/00* (2006.01)

(52) U.S. Cl.
USPC ............ 375/232; 375/324; 375/348; 375/350

(58) Field of Classification Search
USPC ......... 375/230, 232, 233, 322, 324, 326, 327, 375/329, 346, 348, 350
See application file for complete search history.

(56) References Cited

U.S. PATENT DOCUMENTS

| 3,872,381 | A | * | 3/1975 | Yamamoto et al. | 375/290 |
| 6,130,894 | A | * | 10/2000 | Ojard et al. | 370/421 |
| 8,005,135 | B1 | * | 8/2011 | Manickam et al. | 375/232 |
| 2005/0123073 | A1 | * | 6/2005 | Ginesi et al. | 375/326 |
| 2008/0181288 | A1 | * | 7/2008 | Wurzbach et al. | 375/224 |
| 2008/0219383 | A1 | * | 9/2008 | Koslov | 375/326 |

FOREIGN PATENT DOCUMENTS

EP 1 089 457 A2 4/2001

OTHER PUBLICATIONS

Hung et al., "Joint Carrier Recovery and Multimodulus Blind Decision-Feedback Equalization Under High-Order QAM," Proceedings of the IEEE Global Telecommunications Conference, Dallas, Texas, Nov. 29, 2004, vol. 4, pp. 2281-2285.

* cited by examiner

*Primary Examiner* — David B. Lugo
(74) *Attorney, Agent, or Firm* — Seed IP Law Group PLLC

(57) ABSTRACT

A method for demodulating a modulated signal, by: receiving a signal modulated in n-PSK or n-APSK comprising a succession of symbols organized in frames, each frame comprising a header followed by blocks of data symbols separated by blocks of pilot symbols, determining the phase of the headers and pilot blocks to predict the evolution of the signal phase, correcting the phase of the data symbols according to the evolution of the signal phase, and equalizing the data symbols corrected in phase using equalization coefficients evaluated thanks to estimated or known symbols of the signal, and pre-equalizing the header, pilot and data symbols, which is performed before determining the phase of the headers and pilot blocks, and using the estimated equalization coefficients to equalize the data symbols.

29 Claims, 6 Drawing Sheets

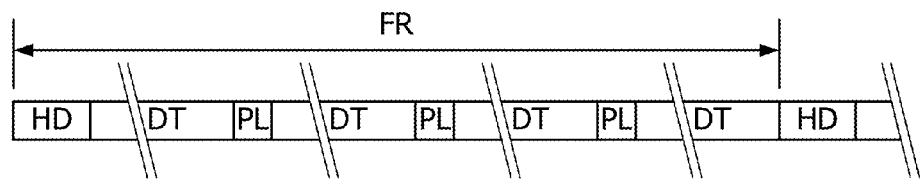
Fig. 1
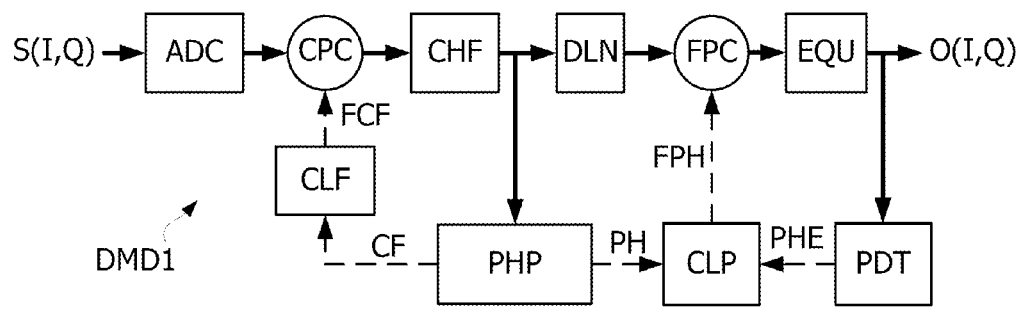
Fig. 2 *(Prior Art)*
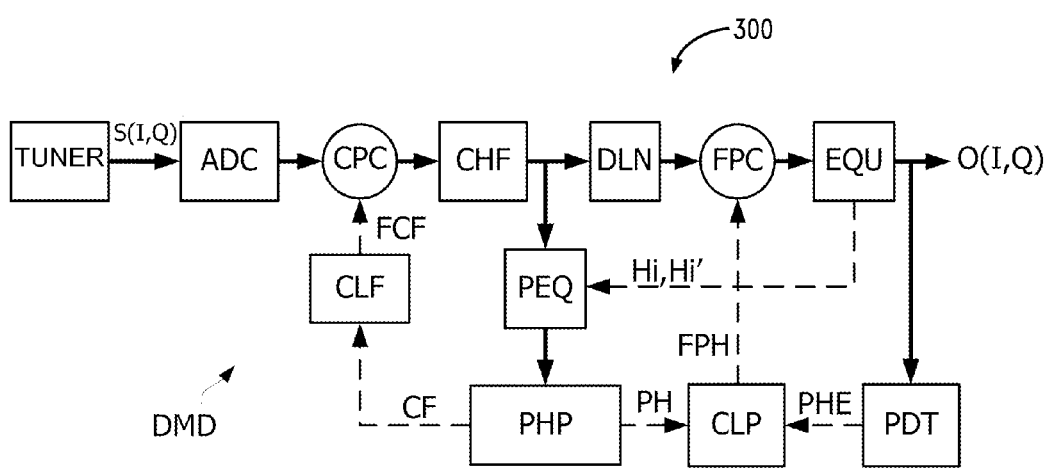
Fig. 3

DVB-S2 DEMODULATOR

BACKGROUND

1. Technical Field

The present disclosure relates to the reception of signals from satellite communication systems and in particular signals complying with the DVB-S2 standard (Digital Video Broadcasting-Satellite 2nd generation).

2. Description of the Related Art

The DVB-S2 standard makes it possible to transmit one or more audio or MPEG-2 or MPEG-4 video flows, modulated in n-PSK (n-phase Phase-Shift Keying) or n-APSK (n-phase Amplitude and Phase Shift Keying), for example QPSK, 8PSK or 16/32APSK.

A DVB-S2 signal comprises a succession of symbols organized in frames of several thousands of symbols. FIG. 1 shows a DVB-S2 frame. In FIG. 1, the frame TR comprises a 90-symbol header HD and 1440-symbol data blocks DT separated by blocks of 36 pilot symbols PL. The header HD announces the frame organization by specifying the modulation used, i.e., QPSK, 8PSK, 16APSK or 32APSK, a redundancy rate of the data coding among a dozen of possibilities, the frame length between a long frame or a short frame, and the presence or not of pilot blocks PL.

The pilot blocks which are known by the DVB-S2 signal receiver allow the phase of the signal received to be precisely estimated by correlation and thus this phase to be followed even in the presence of significant transmission disturbances. The pilot blocks thus allow a phase noise introduced by frequency changes to which the signal is subjected since its emission to be compensated. The main disturbance to which the signal transmitted is subjected is usually a white and Gaussian noise for a transmission channel of a satellite. The frequency changes to which the signal transmitted is subjected are successively introduced by the transmitter, the satellite transponder, the Low-Noise Block LNB and the receiver tuner. The frequency changes introduce a relatively significant phase noise that the receiver must assess and compensate. In addition, the base frequency of the received signal may vary in a relatively significant range (several MHz) due to the limited precision of some elements of the reception chain, and in particular the block LNB.

The shape of the DVB-S2 signal and the disturbances to be taken into account imply some constraints on the architecture of a DVB-S2 signal demodulator. A carrier frequency offset is compensated for before performing a channel filtering. In fact, if the frequency offset is of 5 MHz and the channel has a 10 MHz width, a channel filtering before compensating the frequency offset would have the effect of replacing 5 MHz of useful frequency band by some noise and/or a band of same width of the adjacent channel. Using the pilot symbols to follow the phase of the received signal supposes knowing the future state of the pilot symbols before being able to decode a symbol. Thus, the signal is delayed by at least one interval between two pilot blocks, i.e., 1440 symbols, before assessing the phase of the data symbols between the two pilot blocks.

FIG. 2 schematically shows an example of a DVB-S2 signal demodulator. In FIG. 2, the demodulator DMD1 receives from a tuner a signal S comprising a component in phase I and a component in quadrature Q. The demodulator comprises an analog-to-digital conversion module ADC, a rough frequency correction module CPC, a channel filtering module CHF, a header and pilot symbol processing module PHP, a carrier frequency offset loop filter CLF, a delay line DLN, a fine phase correction module FPC, an equalization module EQU, a phase detection module PDT and phase loop filter CLP.

The module ADC digitizes the signal S at a high sampling frequency (typically 100 to 150 MHz). The module CPC applies to the digitized signal S a frequency translation to roughly correct the carrier frequency offset. The signal translated in frequency at the output of the module CPC is supplied to the module CHF. The module CHF filters and re-samples the signal translated in frequency to a multiple of the symbol frequency of the signal S. The module CHF thus allows in particular the noise outside a channel to be suppressed. The headers HD of the re-sampled signal may thus be decoded, so as to allow the data transmitted by the signal S to be decoded. The re-sampled signal is thus transmitted to the module PHP. At the same time, the re-sampled signal passes through the delay line DLN delaying the signal for a time so the module PHP can supply information allowing the data of the signal S to be decoded. The module CLF performs filtering the carrier frequency offset measured by the module PHP and supplies a filtered value to the module CPC which uses this value to correct the frequency of the signal. The module PHP uses two successive pilot blocks PL of the signal S to reconstruct the evolution of the phase of the re-sampled signal containing the data to be decoded between the two blocks PL. The phase of this signal may thus be for example obtained by interpolation from the phases of the two successive blocks PL. The delay applied to the signal by the delay line DLN is therefore higher than the number of symbols between two pilot blocks PL. The module PHP supplies a phase correction value which is processed by the module CLP before being supplied to the fine phase correction module FPC. The module FPC corrects the phase of the data symbols coming from the delay line DLN according to the correction values filtered by the module CLP. The module FPC supplies a data signal corrected in phase to the equalization module EQU. The equalization module EQU conventionally comprises an equalizer of the self-adapting type which uses the known or estimated symbols to correct equalization coefficients. In fact, the signal S may have been subjected to harmonic distortions which may have several causes. In particular, these distortions may come from filters of the satellite transponder which introduce a group delay on the edges of the signal spectrum. These distortions may also come from base-band filters between the receiver tuner and the analog-to-digital converter. These distortions may also come from the impedance mismatch in a transmission cable between the receiving satellite dish antenna and the decoder; the mismatch may cause echoes and amplitude and phase disturbances according to the frequency.

The module PHP reconstructs the signal phase between two consecutive pilot blocks by taking phase measurements on these by correlation. In the event of severe harmonic distortions, the phase measurements are also disturbed and the residual phase error is increased, thus decreasing the demodulator performance. In response, the minimum level of the signal-to-noise ratio is often increased to obtain a transmission without error, which reduces the transmission efficiency. In addition, decoding the headers HD may also be disturbed. In some transmission modes without pilots, in particular the modes called ACM (Adaptative Coding and Modulation), the headers may be the only reliable information allowing a possible frequency drift of the block LNB to be followed when the noise level only makes it possible to decode the data with a maximum protection.

To free from severe harmonic distortions to which a DVB-S2 signal may be subjected, it has already been suggested to perform decoding the pilot symbols again after equalization and to process the resulting signal in another phase loop. This solution reveals to be expensive since it includes implementation of another delay line to perform an interpolation between two successive pilot blocks PL after equalizing. Moreover this solution does not improve the headers HD before the decoding thereof. It has also been suggested to perform equalizing before decoding the pilot symbols. At the time of equalization, no known or estimated data are therefore available since they may be affected by a significant phase or frequency error. Updating the equalizer coefficients is performed by so-called "blind" algorithms which are less efficient and slower to converge than self-adapting algorithms using known or estimated data.

BRIEF SUMMARY

An embodiment provides a low-cost demodulator which improves the quality of headers and pilot symbols, and which suppresses or reduces the noise caused by harmonic distortions.

On embodiment relates to a method for demodulating a modulated signal, comprising: receiving a signal modulated in n-PSK or n-APSK comprising a succession of symbols organized in frames, each frame comprising a header followed by blocks of data symbols separated by blocks of pilot symbols, determining the phase of the headers and pilot blocks to predict the evolution of the signal phase, correcting the phase of the data symbols according to the evolution of the signal phase, equalizing the data symbols corrected in phase using equalization coefficients evaluated thanks to estimated or known symbols of the signal. According to one embodiment, the method comprises pre-equalizing the header, pilot and data symbols, which is performed before determining the phase of the headers and pilot blocks, and using the estimated equalization coefficients to equalize the data symbols.

According to one embodiment, the phase of a data symbol is adjusted according to a phase determined by interpolation between phases determined for pilot blocks preceding and following the data symbol.

According to one embodiment, the method comprises measuring a carrier frequency offset and correcting the signal according to the carrier frequency offset.

According to one embodiment, equalizing and pre-equalizing are performed with filters of FIR type using at least partially the same equalization coefficients calculated for the equalization filter.

According to one embodiment, equalizing and pre-equalizing are performed using an equalizer of FFE type connected in series with a filter of DFE type.

According to one embodiment, equalizing and pre-equalizing are performed using filters of FIR type, the pre-equalization FIR filter(s) only using significant equalization coefficients used for equalization.

According to one embodiment, equalizing is performed using a first filter of FIR type and a second filter of FIR type connected to the input of an adder, pre-equalizing being performed using a third filter of FIR type using the same equalization coefficients as the first filter of FIR type, and a one-stage filter of IIR type using a main equalization coefficient of the second filter of FIR type, the third filter of FIR type and the filter of IIR type being connected to the input of an adder.

According to one embodiment, equalizing is performed using a first filter of FIR type and a second filter of FIR type connected to the input of an adder, pre-equalizing being performed using a third filter of FIR type using the same equalization coefficients as the first filter of FIR type, connected in series with a fourth one-stage filter of FIR type using a main inverted equalization coefficient of the second filter of FIR type.

According to one embodiment, the method comprises replacing each data symbol in the received signal by a symbol which amplitude and phase correspond to those of a modulation constellation point the nearest of a point having the amplitude and phase of the data symbol.

In an embodiment, a demodulator of a signal modulated in n-PSK or n-APSK comprising a succession of symbols organized in frames, each frame comprising a header followed by blocks of data symbols separated by blocks of pilot symbols is configured to implement an embodiment of a method disclosed herein, the demodulator comprising an equalizer for equalizing data symbols of the received signal corrected in phase, using equalization coefficients assessed using estimated or known symbols of the signal, and a pre-equalizer for equalizing the header and pilot symbols before they are corrected in phase, using the equalization coefficients estimated by the equalizer.

According to one embodiment, the demodulator comprises a loop for correcting carrier frequency offset, configured to measure a carrier frequency offset, and to correct the signal to be demodulated according to carrier frequency offset measurements.

According to one embodiment, the demodulator comprises a phase lock loop configured to determine a phase of each data symbol received from measured phases of pilot symbols transmitted before and after the data symbol, and to apply a phase difference to the data symbol according to the determined phase.

According to one embodiment, the equalizer and pre-equalizer comprise filters of FIR type using at least partially the same equalization coefficients calculated for the equalizer.

According to one embodiment, the equalizer comprises an equalizer of FFE type connected in series with a filter of DFE type, the equalizer of DFE type comprising a circuit for calculating equalization coefficients of the equalizers of FFE and DFE type, the pre-equalizer comprising a filter of FFE type and a filter of DFE type connected to the input of an adder, and which may use only significant equalization coefficients used by the equalizer.

According to one embodiment, the equalizer comprises a filter of FFE type and a filter of FIR type connected to the input of an adder, and a circuit for calculating equalization coefficients of the filters of FFE and FIR type, the pre-equalizer comprising a filter of FFE type using the same equalization coefficients as the filter of FFE type of the equalizer, and a one-stage filter of IIR type using a main equalization coefficient of the filter of FIR type of the equalizer, the pre-equalization filter of FFE type and the filter of IIR type being connected to the input of an adder.

According to one embodiment, the equalizer comprises a filter of FFE type and a filter of FIR type connected to the input of an adder, and a circuit for calculating equalization coefficients of the filters of FFE and DFE type, the pre-equalizer comprising a filter of FFE type using the same correction coefficients as the filter of FFE type of the equalizer, in series with a one-stage filter of FIR type using a main inverted equalization coefficient of the filter of FIR type of the equalizer.

According to one embodiment, the equalizer is configured to replace each data symbol in the received signal by a symbol which amplitude and phase correspond to those of a modulation constellation point the nearest of a point having the amplitude and phase of the data symbol.

In one embodiment, a demodulator comprises: an input configured to receive a signal having a succession of symbols organized in frames, each frame having a header followed by blocks of data separated by blocks of pilot symbols; a header and pilot symbol processing module configured to generate information indicative of a phase of the signal based on a phase of header and pilot symbols in the signal; a fine phase correction module configured to correct the phase of the data symbols based on the information indicative of a phase of the signal; an equalizer configured to generate equalization coefficients based on estimated or known symbols of the signal and to equalize the data symbols based on the equalization coefficients; and a pre-equalizer coupled between the input and the header and pilot symbol processing module and configured to receive at least some of the generated equalization coefficients from the equalizer and to pre-equalize header and pilot symbols based on the at least some of the generated equalization coefficients. In one embodiment, the equalizer comprises a first feed forward equalizer connected in series with a first decision feed back equalizer; and the pre-equalizer comprises a second feed forward equalizer connected in series with a second decision feed back equalizer. In one embodiment, the equalizer and pre-equalizer each comprise FIR filters and the FIR filter of the pre-equalizer is configured to use only significant coefficients of the FIR filter of the equalizer. In one embodiment, the equalizer comprises: a first adder; a first filter of FIR type coupled to an input of the first adder; and a second filter of FIR type coupled to another input of the first adder; and the pre-equalizer comprises: a second adder; a third filter of FIR type configured to use equalization coefficients of the first filter of FIR type and coupled to an input of the second adder; and a one-stage filter of IIR type configured to use a main equalization coefficient of the second filter of FIR type and coupled to another input of the second adder. In one embodiment: the equalizer comprises a first filter of FIR type configured to use a first set of equalization coefficients and a second filter of FIR type configured to use a second set of equalization coefficients coupled to respective inputs of an adder; and the pre-equalizer comprises a third filter of FIR type configured to use the first set of equalization coefficients, connected in series with a fourth one-stage filter of FIR type configured to use a main inverted equalization coefficient of the second set of equalization coefficients. In one embodiment, the equalizer is configured to replace each data symbol in the received signal with a symbol whose amplitude and phase correspond to those of a modulation constellation point nearest to a point having an amplitude and phase of the respective data symbol.

In one embodiment, a system comprises: a tuner; and a demodulator having: an input configured to receive a signal having a succession of symbols organized in frames, each frame having a header followed by blocks of data separated by blocks of pilot symbols; a header and pilot symbol processing module configured to generate information indicative of a phase of the signal based on a phase of header and pilot symbols in the signal; a fine phase correction module configured to correct the phase of the data symbols based on the information indicative of a phase of the signal; an equalizer configured to generate equalization coefficients based on estimated or known symbols of the signal and to equalize the data symbols based on the equalization coefficients; and a pre-equalizer coupled between the input and the header and pilot symbol processing module and configured to receive at least some of the generated equalization coefficients from the equalizer and to pre-equalize header and pilot symbols based on the at least some of the generated equalization coefficients. In one embodiment, the equalizer comprises a first feed forward equalizer connected in series with a first decision feed back equalizer; and the pre-equalizer comprises a second feed forward equalizer connected in series with a second decision feed back equalizer. In one embodiment, the equalizer comprises: a first adder; a first filter of FIR type coupled to an input of the first adder; and a second filter of FIR type coupled to another input of the first adder; and the pre-equalizer comprises: a second adder; a third filter of FIR type configured to use equalization coefficients of the first filter of FIR type and coupled to an input of the second adder; and a one-stage filter of IIR type configured to use a main equalization coefficient of the second filter of FIR type and coupled to another input of the second adder. In one embodiment, the equalizer comprises a first filter of FIR type configured to use a first set of equalization coefficients and a second filter of FIR type configured to use a second set of equalization coefficients coupled to respective inputs of an adder; and the pre-equalizer comprises a third filter of FIR type configured to use the first set of equalization coefficients, connected in series with a fourth one-stage filter of FIR type configured to use a main inverted equalization coefficient of the second set of equalization coefficients. In one embodiment, the equalizer is configured to replace each data symbol in the received signal with a symbol whose amplitude and phase correspond to those of a modulation constellation point nearest to a point having an amplitude and phase of the respective data symbol.

In one embodiment, a computer readable memory medium's contents cause a signal processing system to perform a method, the method comprising: pre-equalizing header, pilot and data symbols in a received signal having a succession of symbols organized in frames, each frame comprising a header followed by blocks of data symbols separated by blocks of pilot symbols; determining a phase of the headers and pilot blocks to predict a phase of the signal; correcting a phase of the data symbols based on the predicted signal phase; and equalizing the data symbols corrected in phase using estimated equalization coefficients based on estimated or known symbols of the signal, wherein the pre-equalizing is based on at least one equalization coefficient that is based on an estimated equalization coefficient. In one embodiment, the method further comprises replacing each data symbol in the received signal with a symbol whose amplitude and phase correspond to those of a modulation constellation point nearest to a point having an amplitude and phase of the received data symbol.

BRIEF DESCRIPTION OF THE SEVERAL VIEWS OF THE DRAWINGS

Embodiments will be described hereinafter, in relation with, but not limited to the appended figures wherein:

FIG. 1 previously described shows a frame of a signal complying with the DVB-S2 standard, FIG. 2 previously described schematically shows a DVB-S2 signal demodulator, according to prior art, FIG. 3 schematically shows a DVB-S2 signal demodulator, according to one embodiment, FIGS. 4 and 5 schematically show embodiments of modules suitable for use in an embodiment of the demodulator of FIG. 3.

DETAILED DESCRIPTION

Figure 4:
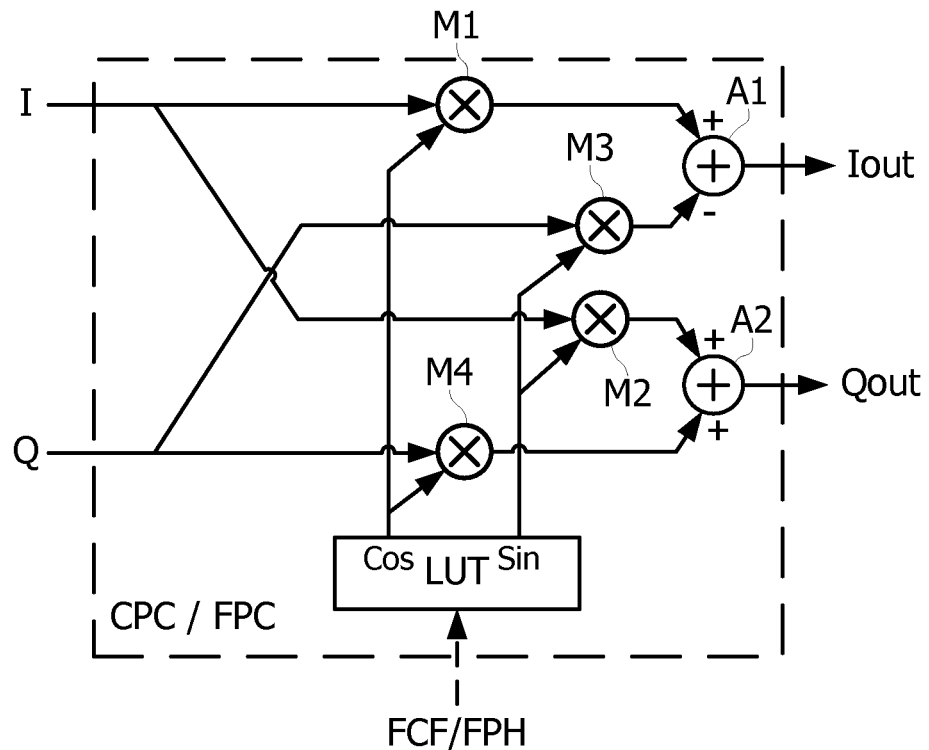

In the following description, numerous specific details are given to provide a thorough understanding of embodiments.

The embodiments can be practiced without one or more of the specific details, or with other methods, components, materials, etc. In other instances, well-known structures, materials, or operations, such as, for example, filters and delay lines, are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

FIG. 3 shows a demodulator of a DVB-S2 signal receiver system 300. In FIG. 3, the demodulator DMD receives from a tuner a signal S comprising a component in phase I and a component in quadrature Q. The signal S is nearly in baseband because a significant carrier frequency offset may remain, typically of some MHz. In the case of a DVB-S2 signal, the signal has a symbol frequency of 1 to 45 Mega symbols per second.

The demodulator DMD comprises an analog-to-digital conversion module ADC, a rough frequency correction module CPC, a channel filtering and re-sampling module CHF, a header and pilot symbol processing module PHP, a delay line DLN, a frequency offset loop filter CLF, a fine phase correction module FPC, an equalization module EQU, a phase detection module PDT and a phase loop filter CLP.

The module ADC digitizes the signal S at a high sampling frequency (typically 100 to 150 MHz). The module ADC may compare the signal S power to a set power and send to the tuner a value representative of the gain. The module CPC applies to the digitized signal S a translation in frequency to roughly correct the carrier frequency offset. To that end, the module CPC multiplies the digitized signal by the function $\exp(j\ 2\ \pi\ f\ t)$ to subject the digitized signal to a spectrum translation of a frequency f which is chosen near an initial frequency offset. The signal translated in frequency at the output of the module CPC has a relatively low residual frequency offset, typically of some kHz. The translated signal is provided to the module CHF. The module CHF filters and re-samples the translated signal to a multiple of the symbol frequency of the signal S, so as to only keep a certain number of samples by symbol. The filter CHF allows in particular the noise outside the transmission channel of the received signal to be suppressed. The headers HD of the re-sampled signal may thus be decoded, so as to allow the following data to be decoded. The re-sampled signal is thus transmitted to the module PHP. At the same time, the re-sampled signal passes through the delay line DLN to delay the signal so the module PHP can supply information allowing the data of the signal S to be decoded. The module CLF performs filtering the carrier frequency offset values measured by the module PHP and supplies a filtered value to the module CPC which uses this value to correct the signal frequency. The modules CPC, CHF, PHP and CLF thus form a first carrier frequency offset correction loop.

The module PHP uses the pilot blocks PL if they are present to predict the evolution of the phase of the re-sampled signal containing the data to be decoded. The phase of this signal may thus for example be obtained by interpolation from two successive pilot blocks PL, or for the first data block of a frame TR, from the header HD and the first pilot block of the frame. The delay applied to the signal by the delay line DLN is therefore higher than the number of symbols between two pilot blocks PL. The module PHP reconstructs the signal phase between two pilot blocks PL by taking phase measurements on these. To that end, the module PHP determines the phase PH of each pilot symbol for example by correlation between known pilot symbols and the signal. The module PHP supplies a phase correction value which is processed by the module CLP before being supplied to the fine phase correction module FPC. The module FPC corrects the phase of the data symbols coming from the delay line DLN according to the correction values filtered by the module CLP. The module FPC is controlled by the phase measurements taken by the module PHP to correct the residual error of the signal phase and frequency. The module FPC supplies a data signal corrected in phase to the equalization module EQU allowing harmonic distortions to be corrected. The equalization module EQU may comprise a conventional equalizer of the self-adapting type which uses the known or estimated symbols to determine equalization coefficients. The signal at the output of the module EQU is sent to the output of the demodulator DMD and to the module PDT which takes a phase error PHE measurement which is transmitted to the module CLP. The phase error PHE measurement allows the phase of each symbol to be adjusted in relation to the filtered value FPH calculated by the module CLP. The set comprising the modules FPC, PDT and CLP form a Phase Lock Loop PLL.

To free from severe harmonic distortions, the demodulator DMD comprises in one embodiment a pre-equalization module PEQ processing the signal, and in particular the headers HD and pilot blocks PL, before they are transmitted to the module PHP. The module PEQ applies to the signal an equalization process close to that applied by the equalization module EQU.

FIG. 4 shows an embodiment of the module CPC or FPC, suitable for use, for example, in an embodiment of the system 300. The module CPC or FPC comprises two multipliers M1, M2 receiving the component I of the signal supplied to the input of the module CPC/FPC and two multipliers M3, M4 receiving the component Q of the input signal. Another input of the multipliers M1-M4 receives a respective value coming from a table LUT of sine and cosine values, selected according to a phase error value PH supplied by the module CLF for the module CPC or by the module CLP for the module FPC. The outputs of the multipliers M1 and M3 are connected to inputs of an adder A1, and the outputs of the multipliers M2 and M4 are connected to inputs of an adder A2. The adder A1 calculates the difference between the output signals of the multipliers M1 and M3. The adder A2 calculates the sum of the output signals of the multipliers M2 and M4. The outputs of the adders A1, A2 supply the components Iout and Qout of the output signal of the module CPC or FPC, offset from the phase PH. In other words, the modules CPC and FPC calculate for each incoming symbol Sn(I, Q) the offset symbol SOn(Iout, Qout) obtained by the following formulas:

$$I\text{out} = I \cos T(n) - Q \sin T(n) \quad (1)$$

$$Q\text{out} = I \sin T(n) + Q \cos T(n) \quad (2)$$

where $T(n)=T(n-1)+\text{Off}$, $T(n-1)$ and $T(n)$ are the estimated phases of consecutive symbols $S_{n-1}$ and $S_n$, and Off is proportional to the frequency or phase offset supplied by the module CLF or CLP.

Figure 5:
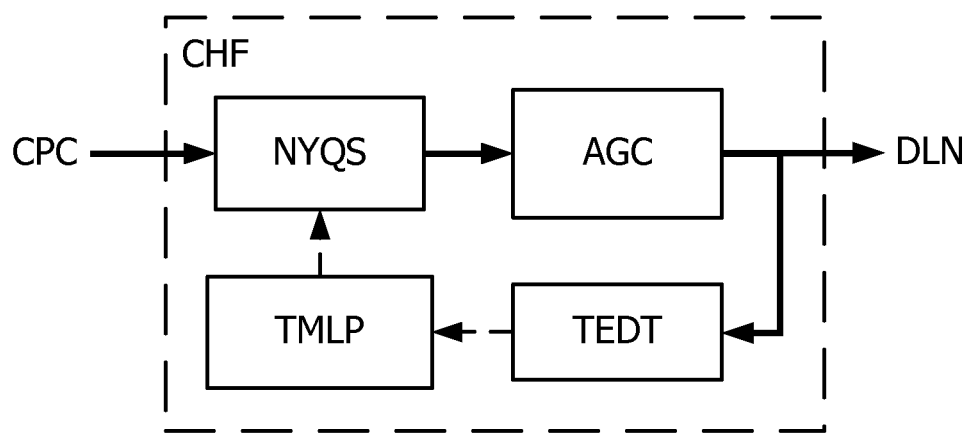
Figure 6:
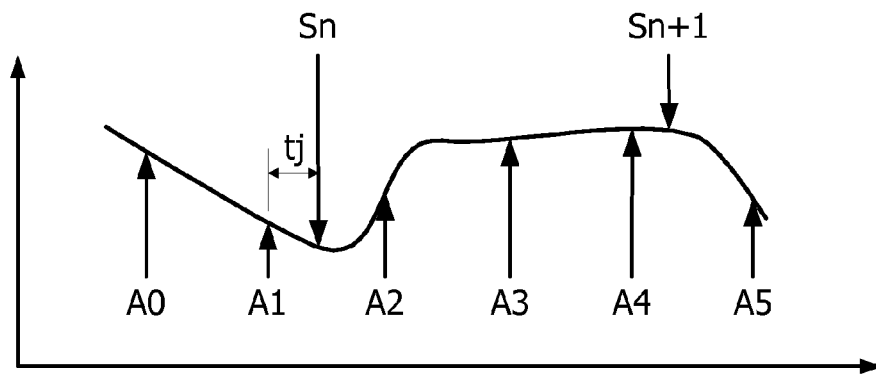
FIG. 6 shows an example of signal shape processed by an embodiment of a demodulator, FIGS. 7 and 12 schematically show embodiments of other modules suitable for use in embodiments of the demodulator of FIG. 3.

FIG. 5 shows an embodiment of the channel filtering and re-sampling module CHF, suitable for use, for example, in an embodiment of the system 300 of FIG. 3. The module CHF comprises an adapted filter NYQS, a gain control module AGC, a synchronization loop comprising a synchronization error measuring module TEDT and a synchronization loop filter TMLP. The filter NYQS is for example an adapted Nyquist filter, maximizing the signal-to-noise ratio. The filter NYQS may be made from a filter of the type Finite Impulsional Response FIR which equalization coefficients are fixed and determined from transmission characteristics of the signal S. The filter NYQS performs an estimation of the signal either at the same time or before filtering the signal at the output of the module CPC. This estimation consists in determining the value of the signal at a symbol optimum time according to close samples, either by filtering or by a pre-defined order interpolation. The signal processed by the filter NYQS is transmitted to the module AGC. The module AGC may comprise a multiplier which gain is controlled according to the required output power of the signal. The signal power is compared to a reference and the multiplier gain is increased or decreased according to the comparison result. The module TEDT receives the signal at the output of the module AGC and assesses a synchronization error of the symbols after changing the frequency of the re-sampled signal to the symbol frequency. The synchronization error is averaged by filtering on several hundreds of symbols by the loop filter TMLP. The filtered error is applied to the filter NYQS to sample the symbols at their optimum value. The module TEDT comprises for example a Digitally Controlled Oscillator DCO which may be made by a modulo accumulator 1 which accumulates a value Fsymb/Fsamp of the ratio of the estimated symbol frequency to the sampling frequency. At each overflow a new symbol appears and the accumulator content gives the time tj indicated in FIG. 6. FIG. 6 shows the signal shape at the input of the filter NYQS. Down arrows show optimum instants of the symbols Sn and Sn+1 in the signal. Up arrows show sampling instants A0, A1, A2, A3, A4, A5 of the signal. The time tj shows the difference between the optimum instant of the symbol Sn in the signal and the previous sampling instant A1.

The module PHP analyzes the signal to identify the headers HD and the pilot symbols PL. To that end, the module PHP tries to decode by correlation each header consisting of a sequence of 90 symbols, 26 of which are known and 64 of which code 7 bits which therefore form a combination among 128 possible combinations. Given the high coding redundancy of the header information (7 bits coded with 64 bits), there is in principle no decoding error. This decoding allows a carrier frequency offset value and a symbol reference phase, which are supplied to the module FPC, to be estimated. The offset value may be previously filtered on several successive headers so as to decrease the influence of noise on the symbols. Decoding the 7 bits of information contained in the headers supplies in particular the length of the frame TR which follows and indicates if the frame contains pilot symbols. Each header initializes a time base allowing the position of the data DT, the possible pilot symbols PL and the next header HD to be predicted. The module PHP also processes the pilot blocks PL comprising 36 symbols by measuring their phase by correlating the signal with a known pilot block. The interval between the pilot blocks is of 1440 data symbols. During this time interval, the phase noise may cause a signal rotation of some degrees which may be partially corrected thanks to the pilot symbols. For example, a simple linear interpolation between two pilot blocks PL allows a reference phase to be obtained to decode the data symbols. The slope between two symbol blocks PL corresponds to a residual value of the frequency offset. To perform such an interpolation, it is necessary to wait for the following pilot block. That is the reason why the delay line DLN delays the signal of at least 1440+36 symbols in the case of a DVB-S2 signal.

In one embodiment, the equalization module EQU comprises a self-adapting filter of the type Finite Impulsional Response FIR, i.e., which equalization coefficients are calculated and refined according to the signal to be processed. The pre-equalization module PEQ also comprises a filter of FIR type receiving the equalization coefficients of the filter of the module EQU. The module PEQ performs a relatively precise equalization of the headers and pilots by systematically suppressing the noise generated by the harmonic distortion. It therefore also allows the residual phase noise on the data signal to be reduced, and the risk of wrong decoding of a header which would cause a total loss of a frame TR to be reduced. It is to be noted that the presence of the module PEQ in an embodiment generally does not lead to any risk of instability and generally does not affect the total independence of the various loops of the demodulator DMD.

Figure 7:
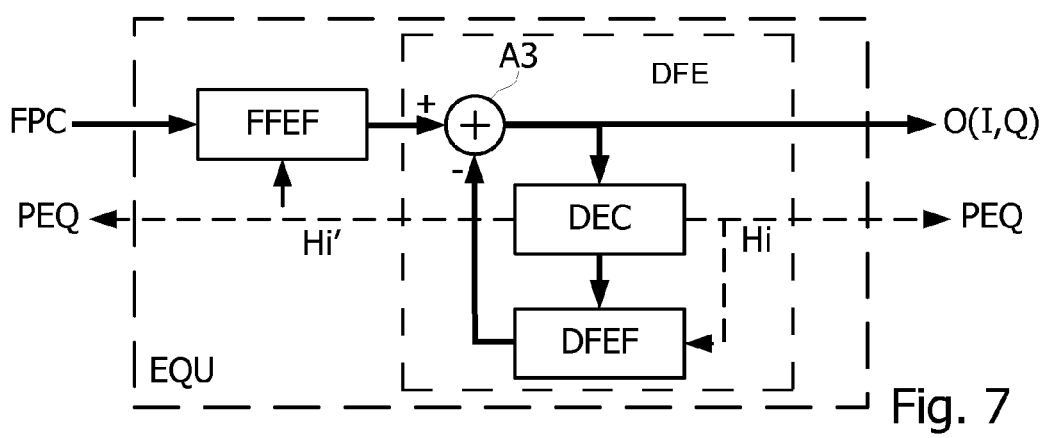
Figure 8:
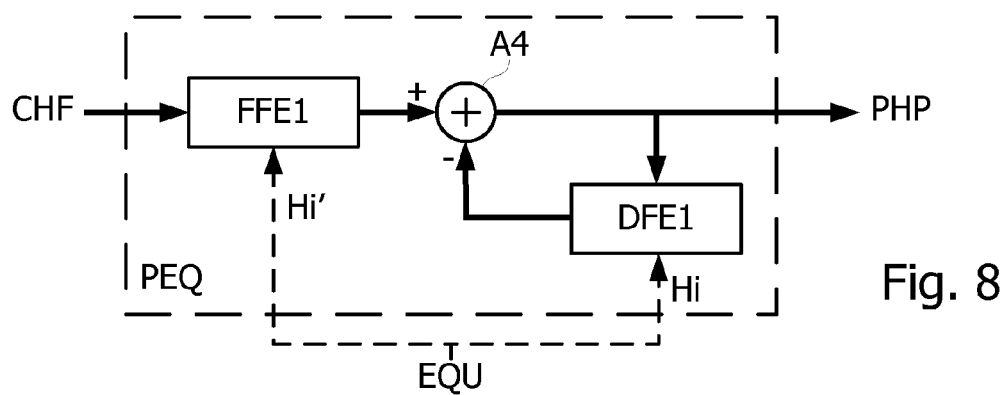

FIGS. 7 and 8 show other embodiments of equalization modules EQU and PEQ, suitable for use, for example, in an embodiment of the system 300 of FIG. 3. In FIG. 7, an embodiment of an equalization module comprises an equalizer of FFE type (Feed-Forward Equalizer) comprising a filter of FIR type FFEF connected in series with an equalizer of DFE type (Decision Feed-back Equalizer) comprising a filter of FIR type DFEF, an adder A3 and a decision module DEC. The filters FFEF and DFEF are connected to a respective input of the adder A3 which subtracts from the output signal of the filter FFEF the output signal of the filter DFEF. The output of the adder A3 which constitutes the output of the module EQU is connected to the module DEC which assesses the equalization coefficients Hi, Hi' of the filters of FIR type FFEF and DFEF so as to minimize errors. The module DEC is connected to the input of the filter DFEF. The filter DFEF assesses the echo in the input signal of the module EQU by modeling the transmission channel of the signal by a filter of FIR type. The filter FFEF makes it possible to correct what is not modeled by the equalizer DFE, and in particular the group delay. In fact, the phase response of a filter generally depends on the frequency. If this phase varies linearly according to the frequency, the filter is called a "linear phase" filter. The components of a signal passing in this filter will be delayed by a same value, called "group delay", defined as the phase derivative with respect to the pulsation. However, the signal to be processed generally has a phase distortion, and the group delay is not the same on all frequencies. For satellite transmission for example, there is more delay on the band edge than in the middle. This distortion may be corrected by a constant gain filter in the useful band, such as a filter of FIR type which corrects the signal phase. The filter FFEF thus allows this distortion, as well as other distortions, for example of amplitude, which may be present in the signal to be processed, to be corrected.

In FIG. 8, an embodiment of a module PEQ comprises an equalizer of FFE type comprising a filter of FIR type FFE1 which equalization coefficients Hi' are those of the filter FFEF, connected in series with an equalizer of DFE type without decision module comprising a FIR filter DFE1 which equalization coefficients Hi are derived from those of the filter DFEF and an adder A4 which subtracts from the output signal of the filter FFE1, the output signal of the filter DFE1. The output of the adder A4 which constitutes the output of the module PEQ is connected to the input of the filter DFE1.

Figure 9:
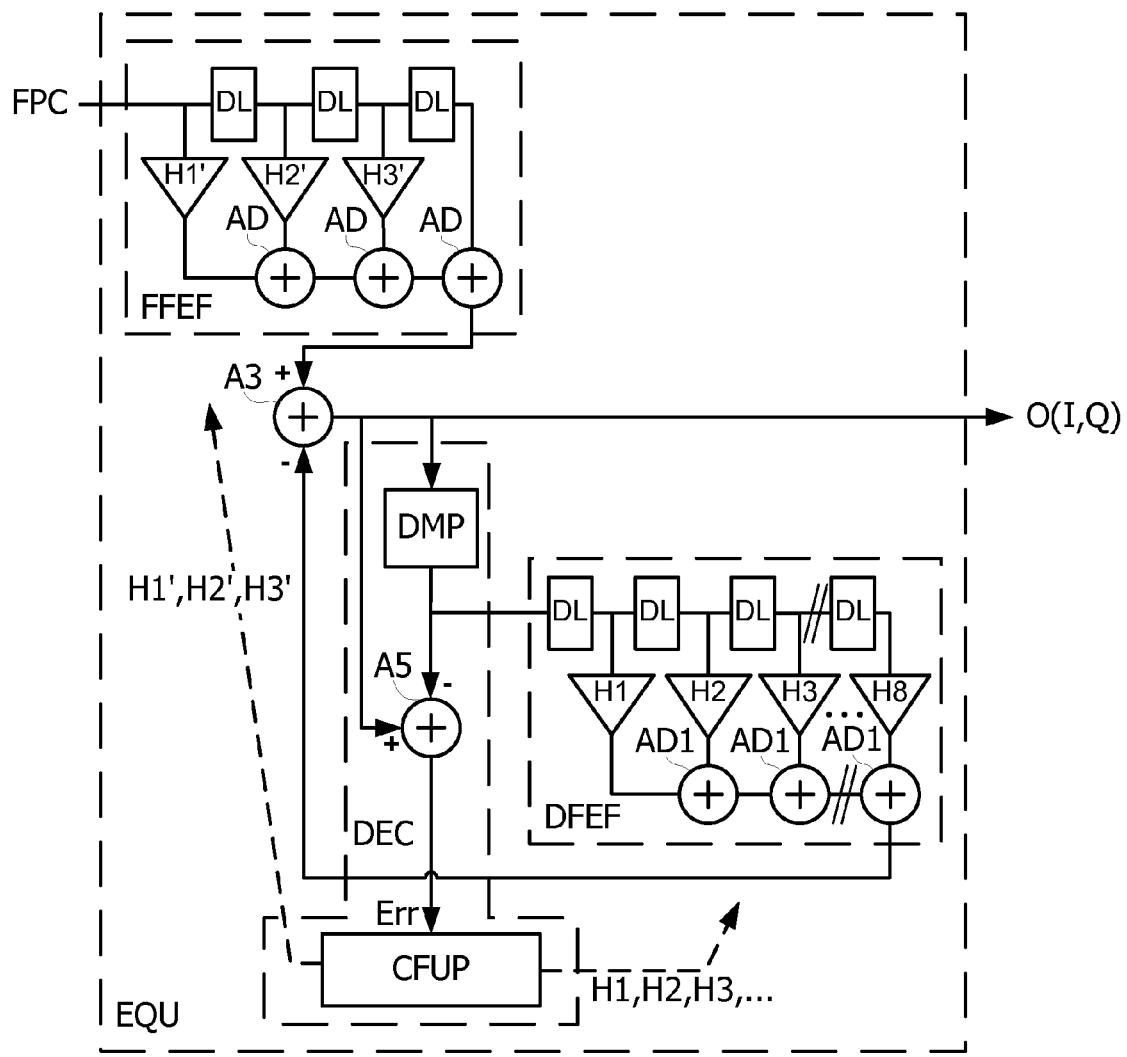
Figure 10:
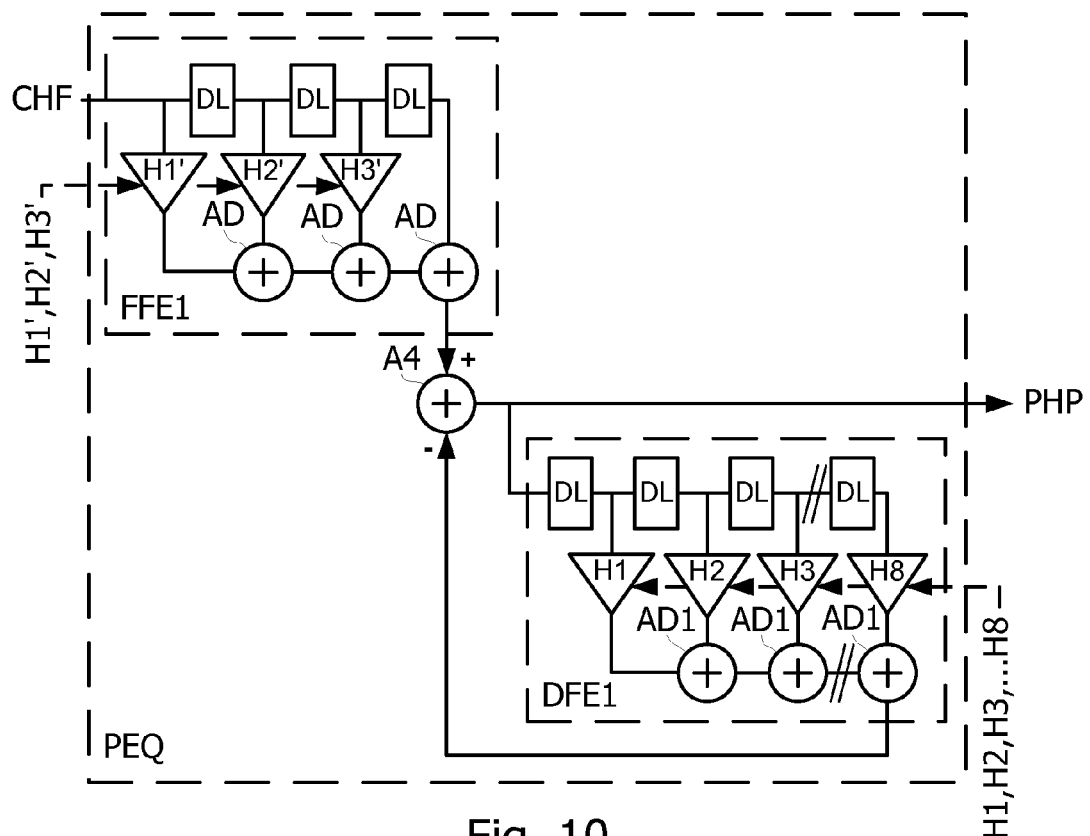

FIGS. 9 and 10 show a more detailed embodiment of equalization modules EQU and PEQ, suitable for use, for example, in the embodiment of a system 300 of FIG. 3. In FIG. 9, the filter FFEF is a filter with four equalization coefficients H1', H2', H3' and 1 and comprises four stages separated by a delay line DL of a symbol period, i.e., three first stages comprising a multiplier of equalization coefficients H1', H2', H3', and a last stage constituted by a simple electrical link. The filter FFEF comprises three adders AD connected in chain, the inputs of a first adder AD being connected to the outputs of the multipliers H1', H2', the other inputs of the two other adders AD being connected to the output of the multiplier H3' and the output of the delay line DL of the last stage. The output of a last adder AD is connected to the adder A3. The filter DFEF is a filter with eight equalization coefficients H1, H2, H3 ... H8 and thus comprises eight stages interconnected by adders AD1 connected in chain. Each stage comprises a delay line DL of a symbol period in parallel with a multiplier of equalization coefficient H1-H8. The inputs of the first adder AD1 are connected to the outputs of the multipliers by the coefficients H1 and H2, and an input of each of the adders AD1 is connected to the output of the multipliers by the coefficients H3-H8. The output of a last adder AD1 of the filter DFEF is connected to an inverting input of the adder A3. The decision module DEC comprises a demapping module DMP, an adder A5 and a coefficient calculation module CFUP. The module DMP is connected in input to the output of the adder A3 and in output to the delay line DL of a first stage of the filter DFEF and an inverting input of the adder A5. A direct input of the adder A5 is connected to the output of the adder A3. The output of the adder A5 supplies an error value Err between the output signal of the module EQU and the output signal of the module DMP. The error value Err is supplied to the input of the module CFUP which calculates adjusted values of the equalization coefficients H1'-H3 and H1-H8 according to the error value Err. The module DMP takes a decision on each sample, by replacing each sample (I,Q) received by a point (Id,Qd) the nearest to the modulation constellation expected, such as specified in the header HD. For example in QPSK modulation, $$Id = \frac{a\sqrt{2}}{2} \cdot sign(I), \quad (3)$$

and $$Qd = \frac{a\sqrt{2}}{2} \cdot sign(Q), \quad (4)$$

where a is the constellation radius, and sign(x) is a function giving the sign of x.

In FIG. 10, the filters FFE1 and DFE1 of the module PEQ are identical to the filters FFEF and DFEF of the module EQU. The outputs of the filters FFE1 and DFE1 are connected to respective inputs of the adder A4 which subtracts the output signal of the filter DFE1 from the output signal of the filter FFE1. The output of the adder A4 is connected to the output of the module PEQ.

The behavior of the equalizer DFE comprising the filter DFEF or DFE1 and the adder A3 or A4 is described by the following symbolic equations:

$$y = x - z^{-1} \hat{y} \cdot H(z) \quad (5)$$

where y is a filter output symbol, x is a filter input symbol, H(z) is the filter DFEF or DFE1 transfer function, $\hat{y}=y-e$ is the estimated symbol and e the residual error, normally consisting of white Gaussian noise when the equalizer has converged. Finally, the result is that:

$$y = \frac{x}{1+H(z) \cdot z^{-1}} + e \frac{H(z) \cdot z^{-1}}{1+H(z) \cdot z^{-1}} \quad (6)$$

The transfer function H of the filter DFEF or DFE1 has the following form:

$$H(z) = H1 + H2 \cdot z^{-1} + H3 \cdot z^{-2} + \ldots + H8 \cdot z^{-7} \quad (7)$$

The equalization coefficients H1-H8 of the filter are generally low (rarely above 0.2). In a first order approximation of the residual error, e may be neglected. In addition, if the coefficients H2, H3, ... are little in relation to 1, as it is the case in practice, only the coefficient H1 may be kept in the filter DFE1. The transfer function of the equalizer DFE comprising the filter DFE1 and the adder A4 may therefore be approximated as follows:

$$H(z) = \frac{1}{1+H1 \cdot z^{-1}} \quad (8)$$

Figure 11:
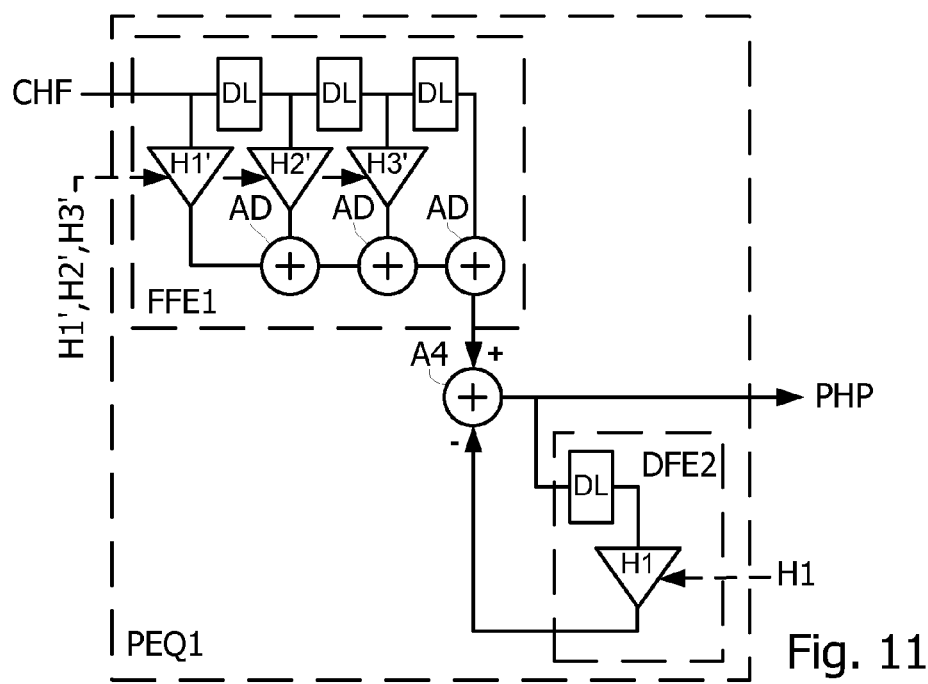

FIG. 11 shows another embodiment of the pre-equalization module. In FIG. 11, the pre-equalization module PEQ1 varies from the module PEQ shown in FIG. 10 in that the filter DFE1 is replaced by a simplified filter DFE2 having the transfer function given in the formula (8). Thus, the filter DFE2 comprises a delay line DL of a symbol period connected in input to the output of the adder A4 and in output to a coefficient multiplier H1, the output of the multiplier being connected to the inverting input of the adder A4. The filter DFE2 thus forms a filter IIR (Infinite Impulsional Response filter) with a single coefficient H1.

The fraction of the formula (8) may be replaced by a Taylor expansion of the first order of this fraction, so that the transfer function H(z) of the equalizer DFE is approximated by the following filter FIR transfer function:

$$H(z) = 1 - H1 \cdot z^{-1} \quad (9)$$

The equalization coefficients of the filter FIR approximating the equalizer DFE are therefore 1 and −H1.

Figure 12:
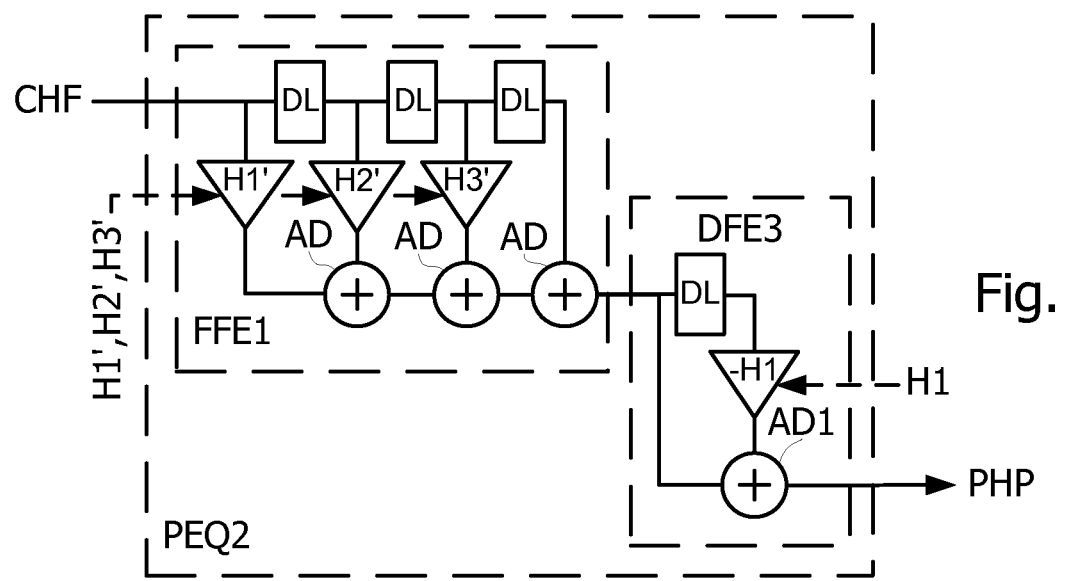

FIG. 12 shows another embodiment of a pre-equalization module. In FIG. 12, the pre-equalization module PEQ2 varies from the module PEQ1 shown in FIG. 11 in that the filter DFE2 has been replaced by a filter DFE3 and the adder A4 has been suppressed, the filter DFE3 being in series with the equalizer FFE1. The filter DFE3 comprises a delay line DL and an adder AD. The delay line DL and the adder AD of the filter DFE3 are connected in input to the output of the filter FFE1, the output of the delay line DL being connected to another input of the adder AD1. The output of the adder AD1 is connected to the output of the module PEQ2. Thus, the filter DFE3 has the simplified transfer function given by the formula (9).

In another embodiment, the filter FFE1 of the module PEQ1 or PEQ2 corresponding to the filter FFEF of the module EQU comprises the significant stages of the filter FFEF. Thus, if the filter FFEF comprises 5 stages, the filter FIR of the module PEQ1 or PEQ2 may only comprise the 3 main stages of the filter FFEF; the equalization coefficients of the stages being lower and lower from the main stage.

At the beginning of a channel search, the equalization coefficients of the module EQU are usually null, except in the filter FFEF comprising only a stage which coefficient is not null (equal to 1). A first decoding of the transmitted data is performed with not equalized data. Once the estimated carrier frequency is close to the actual carrier frequency, the module EQU begins to converge and the assessment of the pilot symbols PL becomes more and more precise. It is to be noted that there is not risk of instability since the processing branches of the pilot symbols and data symbols are decoupled.

It will be clear to those skilled in the art that the present disclosure is susceptible of various embodiments and applications. In particular, embodiments of the disclosure may be applied to other signal shapes than DVB-S2 signals, and, for example, in particular to signals transmitted in the form of symbol frames with pilot symbols allowing the signal frequency and phase to be estimated.

The disclosure is not limited either to processing signals previously digitized, all the processes described applied to the signal to be demodulated may be performed in analog.

The disclosure is not limited either to an interpolation process between the estimated phases of two consecutive pilot blocks to assess the phase evolution between two pilot symbols. In fact, the disclosure does not necessarily apply to a highly disturbed signal, and assessing the phase of one or more pilot symbols may be sufficient to assess the signal phase. Thus, some embodiments may not use a delayline to sufficiently delay the signal to be able to use two successive pilot blocks before being able to process the signal between the two pilot blocks. Likewise, some embodiments may not have a phase error detection module at the output of the equalizer to finely adjust the phase.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for demodulating a modulated signal, comprising:
   receiving a signal modulated in n-PSK or n-APSK comprising a succession of symbols organized in frames, each frame comprising a header followed by blocks of data symbols separated by blocks of pilot symbols;
   pre-equalizing the header, pilot and data symbols;
   determining a phase of the headers and pilot blocks to predict an evolution of a signal phase;
   correcting a phase of the data symbols according to the predicted evolution of the signal phase; and
   equalizing the data symbols corrected in phase using a plurality of estimated equalization coefficients based on estimated or known symbols of the signal, wherein the pre-equalizing uses one of the estimated equalization coefficients used to equalize the data symbols and at least one of:
      another estimated equalization coefficient used to equalize the data symbols; and
      an inverse of another estimated equalization coefficient used to equalize the data symbols, wherein equalizing is performed using a first filter of FIR type and a second filter of FIR type coupled to respective inputs of a first adder, pre-equalizing being performed using a third filter of FIR type using equalization coefficients used by the first filter of FIR type, and a one-stage filter of IIR type using a main equalization coefficient of the second filter of FIR type, the third filter of FIR type and the filter of IIR type being coupled to respective inputs of a second adder.

2. The method according to claim 1 wherein the phase of a data symbol is adjusted according to a phase determined by interpolation between phases determined for pilot blocks preceding and following the data symbol.

3. The method according to claim 2, comprising measuring a carrier frequency offset and correcting the signal according to the carrier frequency offset.

4. The method according to claim 1 wherein equalizing and pre-equalizing are performed with filters of FIR type and pre-equalization comprises using at least partially equalization coefficients calculated for the equalizing.

5. The method according to claim 1 wherein equalizing and pre-equalizing are performed using filters of FIR type, the pre-equalization FIR filter(s) only using significant equalization coefficients used for equalization.

6. The method according to claim 1, comprising replacing each data symbol in the received signal with a symbol whose amplitude and phase correspond to those of a modulation constellation point nearest to a point having an amplitude and phase of the received data symbol.

7. A method for demodulating a modulated signal, comprising:
   receiving a signal modulated in n-PSK or n-APSK comprising a succession of symbols organized in frames, each frame comprising a header followed by blocks of data symbols separated by blocks of pilot symbols;
   pre-equalizing the header, pilot and data symbols;
   determining a phase of the headers and pilot blocks to predict an evolution of a signal phase;
   correcting a phase of the data symbols according to the predicted evolution of the signal phase; and equalizing the data symbols corrected in phase using a plurality of estimated equalization coefficients based on estimated or known symbols of the signal, wherein the pre-equalizing uses one of the estimated equalization coefficients used to equalize the data symbols and at least one of:
  another estimated equalization coefficient used to equalize the data symbols; and
  an inverse of another estimated equalization coefficient used to equalize the data symbols, wherein equalizing is performed using a first filter of FIR type and a second filter of FIR type coupled to respective inputs of an adder, pre-equalizing being performed using a third filter of FIR type using the same equalization coefficients as the first filter of FIR type, connected in series with a fourth one-stage filter of FIR type using a main inverted equalization coefficient of the second filter of FIR type.

8. The method of claim 7 wherein the phase of a data symbol is adjusted according to a phase determined by interpolation between phases determined for pilot blocks preceding and following the data symbol.

9. The method of claim 8, comprising measuring a carrier frequency offset and correcting the signal according to the carrier frequency offset.

10. A demodulator, comprising:
  means for receiving a signal modulated in n-PSK or n-APSK, the received signal comprising a succession of symbols organized in frames, each frame comprising a header followed by blocks of data symbols separated by blocks of pilot symbols;
  means for pre-equalizing the header, pilot and data symbols;
  means for determining a phase of the headers and pilot blocks to predict an evolution of a signal phase;
  means for correcting a phase of the data symbols according to the predicted evolution of the signal phase; and
  means for equalizing the data symbols corrected in phase using estimated equalization coefficients based on estimated or known symbols of the signal, wherein the means for pre-equalizing uses at least two equalization coefficients used by the means for equalizing, wherein:
    the means for equalizing comprises a filter of FFE type and a filter of FIR type connected to respective inputs of an adder, and a circuit for calculating equalization coefficients of the filters of FFE and FIR type; and
    the means for pre-equalizing comprises a filter of FFE type using the same correction coefficients as the filter of FFE type of the means for equalizing in series with a one-stage filter of FIR type using a main inverted equalization coefficient of the filter of FIR type of the means for equalizing.

11. The demodulator according to claim 10, comprising a loop for correcting carrier frequency offset, configured to measure a carrier frequency offset, and to correct a signal to be demodulated according to carrier frequency offset measurements.

12. The demodulator according to claim 10, comprising a phase lock loop configured to determine a phase of each data symbol received from measured phases of pilot symbols transmitted before and after the data symbol, and to apply a phase shift to the data symbol according to the determined phase.

13. The demodulator according to claim 10 wherein the means for equalizing is configured to replace each data symbol in the received signal by a symbol whose amplitude and phase correspond to those of a modulation constellation point nearest to a point having an amplitude and phase of the data symbol.

14. A demodulator, comprising:
  means for receiving a signal modulated in n-PSK or n-APSK, the received signal comprising a succession of symbols organized in frames, each frame comprising a header followed by blocks of data symbols separated by blocks of pilot symbols;
  means for pre-equalizing the header, pilot and data symbols;
  means for determining a phase of the headers and pilot blocks to predict an evolution of a signal phase;
  means for correcting a phase of the data symbols according to the predicted evolution of the signal phase; and
  means for equalizing the data symbols corrected in phase using estimated equalization coefficients based on estimated or known symbols of the signal, wherein the means for pre-equalizing uses at least two equalization coefficients used by the means for equalizing, wherein:
    the means for equalizing comprises a filter of FFE type and a filter of FIR type connected to respective inputs of a first adder, and a circuit for calculating equalization coefficients of the filters of FFE and FIR type; and
    the means for pre-equalizing comprises a filter of FFE type using the equalization coefficients used by the filter of FFE type of the means for equalizing, and a one-stage filter of IIR type using a main equalization coefficient used by the filter of FIR type of the means for equalizing, the filter of FFE type of the means for equalizing and the filter of IIR type being connected to respective inputs of a second adder.

15. The demodulator according to claim 14, comprising a loop for correcting carrier frequency offset, configured to measure a carrier frequency offset, and to correct a signal to be demodulated according to carrier frequency offset measurements.

16. The demodulator according to claim 14, comprising a phase lock loop configured to determine a phase of each data symbol received from measured phases of pilot symbols transmitted before and after the data symbol, and to apply a phase shift to the data symbol according to the determined phase.

17. The demodulator according to claim 14 wherein the means for equalizing is configured to replace each data symbol in the received signal by a symbol whose amplitude and phase correspond to those of a modulation constellation point nearest to a point having an amplitude and phase of the data symbol.

18. A demodulator, comprising:
  an input configured to receive a signal having a succession of symbols organized in frames, each frame having a header followed by blocks of data separated by blocks of pilot symbols;
  a header and pilot symbol processing module configured to generate information indicative of a phase of the signal based on a phase of header and pilot symbols in the signal;
  a fine phase correction module configured to correct the phase of the data symbols based on the information indicative of a phase of the signal;
  an equalizer configured to generate equalization coefficients based on estimated or known symbols of the signal and to equalize the data symbols based on the equalization coefficients; and
  a pre-equalizer coupled between the input and the header and pilot symbol processing module and configured to receive at least two of the generated equalization coefficients from the equalizer and to pre-equalize header and pilot symbols using the at least two received generated equalization coefficients, wherein:
the equalizer comprises:
a first adder;
a first filter of FIR type coupled to an input of the first adder; and
a second filter of FIR type coupled to another input of the first adder; and
the pre-equalizer comprises:
a second adder;
a third filter of FIR type configured to use equalization coefficients of the first filter of FIR type and coupled to an input of the second adder; and
a one-stage filter of IIR type configured to use a main equalization coefficient of the second filter of FIR type and coupled to another input of the second adder.

19. The demodulator of claim 18 wherein the equalizer and pre-equalizer each comprise FIR filters and the FIR filter of the pre-equalizer is configured to use only significant coefficients of the FIR filter of the equalizer.

20. The demodulator of claim 18 wherein the equalizer is configured to replace each data symbol in the received signal with a symbol whose amplitude and phase correspond to those of a modulation constellation point nearest to a point having an amplitude and phase of the respective data symbol.

21. A demodulator, comprising:
an input configured to receive a signal having a succession of symbols organized in frames, each frame having a header followed by blocks of data separated by blocks of pilot symbols;
a header and pilot symbol processing module configured to generate information indicative of a phase of the signal based on a phase of header and pilot symbols in the signal;
a fine phase correction module configured to correct the phase of the data symbols based on the information indicative of a phase of the signal;
an equalizer configured to generate equalization coefficients based on estimated or known symbols of the signal and to equalize the data symbols based on the equalization coefficients; and
a pre-equalizer coupled between the input and the header and pilot symbol processing module and configured to receive at least two of the generated equalization coefficients from the equalizer and to pre-equalize header and pilot symbols using the at least two received generated equalization coefficients, wherein:
the equalizer comprises a first filter of FIR type configured to use a first set of equalization coefficients and a second filter of FIR type configured to use a second set of equalization coefficients coupled to respective inputs of an adder; and
the pre-equalizer comprises a third filter of FIR type configured to use the first set of equalization coefficients, connected in series with a fourth one-stage filter of FIR type configured to use a main inverted equalization coefficient of the second set of equalization coefficients.

22. The demodulator of claim 21 wherein the equalizer is configured to replace each data symbol in the received signal with a symbol whose amplitude and phase correspond to those of a modulation constellation point nearest to a point having an amplitude and phase of the respective data symbol.

23. A system, comprising:
a tuner; and
a demodulator having:
an input configured to receive a signal having a succession of symbols organized in frames, each frame having a header followed by blocks of data separated by blocks of pilot symbols;
a header and pilot symbol processing module configured to generate information indicative of a phase of the signal based on a phase of header and pilot symbols in the signal;
a fine phase correction module configured to correct the phase of the data symbols based on the information indicative of a phase of the signal;
an equalizer configured to generate equalization coefficients based on estimated or known symbols of the signal and to equalize the data symbols based on the equalization coefficients; and
a pre-equalizer coupled between the input and the header and pilot symbol processing module and configured to receive a plurality of the generated equalization coefficients from the equalizer and to pre-equalize header and pilot symbols using the received plurality of the generated equalization coefficients, wherein:
the equalizer comprises:
a first adder;
a first filter of FIR type coupled to an input of the first adder; and
a second filter of FIR type coupled to another input of the first adder; and
the pre-equalizer comprises:
a second adder;
a third filter of FIR type configured to use equalization coefficients of the first filter of FIR type and coupled to an input of the second adder; and
a one-stage filter of IIR type configured to use a main equalization coefficient of the second filter of FIR type and coupled to another input of the second adder.

24. The system of claim 23 wherein the equalizer is configured to replace each data symbol in the received signal with a symbol whose amplitude and phase correspond to those of a modulation constellation point nearest to a point having an amplitude and phase of the respective data symbol.

25. A system, comprising:
a tuner; and
a demodulator having:
an input configured to receive a signal having a succession of symbols organized in frames, each frame having a header followed by blocks of data separated by blocks of pilot symbols;
a header and pilot symbol processing module configured to generate information indicative of a phase of the signal based on a phase of header and pilot symbols in the signal;
a fine phase correction module configured to correct the phase of the data symbols based on the information indicative of a phase of the signal;
an equalizer configured to generate equalization coefficients based on estimated or known symbols of the signal and to equalize the data symbols based on the equalization coefficients; and
a pre-equalizer coupled between the input and the header and pilot symbol processing module and configured to receive a plurality of the generated equalization coefficients from the equalizer and to pre-equalize header and pilot symbols using the received plurality of the generated equalization coefficients, wherein:

the equalizer comprises a first filter of FIR type configured to use a first set of equalization coefficients and a second filter of FIR type configured to use a second set of equalization coefficients coupled to respective inputs of an adder; and the pre-equalizer comprises a third filter of FIR type configured to use the first set of equalization coefficients, connected in series with a fourth one-stage filter of FIR type configured to use a main inverted equalization coefficient of the second set of equalization coefficients.

26. The system of claim 25 wherein the equalizer is configured to replace each data symbol in the received signal with a symbol whose amplitude and phase correspond to those of a modulation constellation point nearest to a point having an amplitude and phase of the respective data symbol.

27. A demodulator, comprising:

an input configured to receive a signal having a succession of symbols organized in frames, each frame having a header followed by blocks of data separated by blocks of pilot symbols;

a header and pilot symbol processing module configured to generate information indicative of a phase of the signal based on a phase of header and pilot symbols in the signal;

a fine phase correction module configured to correct the phase of the data symbols based on the information indicative of a phase of the signal;

an equalizer including first and second equalization filters and configured to generate one or more equalization coefficients of the first equalization filter and one or more equalization coefficients of the second equalization filter based on estimated or known symbols of the signal and to equalize the data symbols based on the generated equalization coefficients; and a pre-equalizer configured to pre-equalize the header and pilot symbols and coupled between the input and the header and pilot symbol processing module, the pre-equalizer including:

a first pre-equalization filter configured to receive at least one of the generated equalization coefficients of the first equalization filter; and a second pre-equalization filter configured to receive at least one of:

a generated equalization coefficient of the second equalization filter; and an inverse of a generated equalization coefficient of the second equalization filter, wherein the first equalization filter and the first pre-equalization filter comprise Finite Impulsional Response (FIR) filters and the first pre-equalization filter is configured to receive a subset of the generated one or more equalization coefficients of the first equalization filter, the subset excluding a least significant coefficient of the generated one or more equalization coefficients of the first equalization filter.

28. A demodulator, comprising:

an input configured to receive a signal having a succession of symbols organized in frames, each frame having a header followed by blocks of data separated by blocks of pilot symbols;

a header and pilot symbol processing module configured to generate information indicative of a phase of the signal based on a phase of header and pilot symbols in the signal;

a fine phase correction module configured to correct the phase of the data symbols based on the information indicative of a phase of the signal;

an equalizer including first and second equalization filters and configured to generate one or more equalization coefficients of the first equalization filter and one or more equalization coefficients of the second equalization filter based on estimated or known symbols of the signal and to equalize the data symbols based on the generated equalization coefficients; and a pre-equalizer configured to pre-equalize the header and pilot symbols and coupled between the input and the header and pilot symbol processing module, the pre-equalizer including:

a first pre-equalization filter configured to receive at least one of the generated equalization coefficients of the first equalization filter; and a second pre-equalization filter configured to receive at least one of:

a generated equalization coefficient of the second equalization filter; and an inverse of a generated equalization coefficient of the second equalization filter, wherein:

the equalizer comprises a first adder;

the first equalization filter comprises a filter of Finite Impulsional Response (FIR) type coupled to an input of the first adder;

the second equalization filter comprises a filter of FIR type coupled to another input of the first adder;

the pre-equalizer comprises a second adder;

the first pre-equalization filter comprises a filter of FIR type configured to use one or more equalization coefficients of the first equalization filter and coupled to an input of the second adder; and the second pre-equalization filter comprises a one-stage filter of Infinite Impulsional Response (IIR) type configured to use a main equalization coefficient of the second equalization filter and coupled to another input of the second adder.

29. A demodulator, comprising:

an input configured to receive a signal having a succession of symbols organized in frames, each frame having a header followed by blocks of data separated by blocks of pilot symbols;

a header and pilot symbol processing module configured to generate information indicative of a phase of the signal based on a phase of header and pilot symbols in the signal;

a fine phase correction module configured to correct the phase of the data symbols based on the information indicative of a phase of the signal;

an equalizer including first and second equalization filters and configured to generate one or more equalization coefficients of the first equalization filter and one or more equalization coefficients of the second equalization filter based on estimated or known symbols of the signal and to equalize the data symbols based on the generated equalization coefficients; and a pre-equalizer configured to pre-equalize the header and pilot symbols and coupled between the input and the header and pilot symbol processing module, the pre-equalizer including:

a first pre-equalization filter configured to receive at least one of the generated equalization coefficients of the first equalization filter; and a second pre-equalization filter configured to receive at least one of:

a generated equalization coefficient of the second equalization filter; and an inverse of a generated equalization coefficient of the second equalization filter, wherein:

the equalizer comprises an adder;

the first equalization filter comprises a filter of Finite Impulsional Response (FIR) type configured to use a first set of generated equalization coefficients and coupled to a first input of the adder;

the second equalization filter comprises a filter of Finite Impulsional Response (FIR) type configured to use a second set of generated equalization coefficients and coupled to a second input of the adder;

the first pre-equalization filter comprises a filter of FIR type configured to use the first set of equalization coefficients;

the second pre-equalization filter comprises a one-stage filter of FIR type configured to use a main inverted equalization coefficient of the second set of equalization coefficients; and the first and second pre-equalization filters are coupled together in series.

\* \* \* \* \*